(12) United States Patent
Chiao (10) Patent No.: US 9,687,923 B2
(45) Date of Patent: Jun. 27, 2017

(54) CUTTING-ANGLE ADJUSTABLE BANDSAW

(71) Applicant: EVERISING MACHINE CO., Taichung (TW)

(72) Inventor: Shu-Chia Chiao, Taichung (TW)

(73) Assignee: EVERISING MACHINE CO., Taichung (TW)

( * ) Notice: Subject to any disclaimer, the term of this patent is extended or adjusted under 35 U.S.C. 154(b) by 0 days.

(21) Appl. No.: 15/058,293

(22) Filed: Mar. 2, 2016

(65) Prior Publication Data

US 2016/0175952 A1   Jun. 23, 2016

Related U.S. Application Data

(63) Continuation-in-part of application No. 13/895,140, filed on May 15, 2013.

(51) Int. Cl.
*B23D 53/04* (2006.01)
*B23D 53/02* (2006.01)

(52) U.S. Cl.
CPC ........... *B23D 53/023* (2013.01); *B23D 53/04* (2013.01); *Y10T 83/7214* (2015.04); *Y10T 83/7264* (2015.04)

(58) Field of Classification Search
CPC .............. Y10T 83/7195; Y10T 83/7201; Y10T 83/7208; Y10T 83/7214; Y10T 83/7226; Y10T 83/7239; Y10T 83/7245; Y10T 83/7251; Y10T 83/7258; Y10T 83/7233; B23D 53/023; B23D 53/04; B23D 57/0061
USPC ..................................................... 83/809–813
See application file for complete search history.

(56) References Cited

U.S. PATENT DOCUMENTS

| | | | | |
|---|---|---|---|---|
| 3,263,537 A * | 8/1966 | Rehman | ................... | B26D 1/48 83/661 |
| 3,736,820 A * | 6/1973 | Jung | ...................... | B23D 55/02 83/730 |
| 4,111,085 A * | 9/1978 | Johnson | ................. | B23D 53/04 83/801 |
| 2007/0028745 A1 * | 2/2007 | Wang | ................... | B23D 53/026 83/813 |

* cited by examiner

*Primary Examiner* — Laura M Lee
(74) *Attorney, Agent, or Firm* — Bruce Stone LLP; Joseph Bruce (57) ABSTRACT

A cutting-angle adjustable bandsaw is provided with a base, a first mounting seat, a second mounting seat, a first saw table, a second saw table, a first drive unit, a second drive unit, a bandsaw unit and an adjustment unit. The first and second drive units can make the first and second saw tables move to different horizontal planes, so as to adjust the band blade riding between the drive wheel and the assistant wheel to an inclined position, so that the cutting angle of the band blade is changed to reduce the contact area between the band blade and the object to be cut.

7 Claims, 15 Drawing Sheets

CUTTING-ANGLE ADJUSTABLE BANDSAW

This application is a continuation in part of U.S. patent application Ser. No. 13/895,140, which claims the benefit of the earlier filing date of May 15, 2013.

BACKGROUND OF THE INVENTION

Field of the Invention

The present invention relates to a bandsaw, and more particularly to a bandsaw whose cutting angle is adjustable.

Description of the Prior Art

A bandsaw is usually used to cut metal, stone or wood and essentially comprises: a base with a work platform, a saw table horizontally movably disposed on the base and riding along the work platform, and a bandsaw drive unit which is vertically movably disposed on the saw table and includes a band blade. An object to be cut is placed on the work platform, and the saw table is controlled to move horizontally and the bandsaw drive unit moves vertically to cut the object.

Since the bandsaw drive unit moves vertically to adjust the cutting area of the object to be cut, and during vertical movement of the bandsaw drive unit, the band blade moves along with the drive unit, as a result, the bandsaw drive unit has a fixed and unadjustable cutting angle (normally horizontal cutting angle), namely, the cutting angle of the bandsaw is unadjustable. When cutting a large object, the contact area between the band blade and the object to be cut will also be large and will cause a large cutting resistance.

The present invention has arisen to mitigate and/or obviate the afore-described disadvantages.

SUMMARY OF THE INVENTION

The primary objective of the present invention is to provide a bandsaw whose cutting angle is adjustable, so as to enhance applicability of the bandsaw.

To achieve the above objective, a cutting-angle adjustable bandsaw in accordance with the present invention comprises: a base including a work platform, a first lateral portion disposed at one side of the work platform, and a second lateral portion disposed at another side of the work platform; a first mounting seat horizontally slidably disposed on the first lateral portion; a second mounting seat horizontally slidably disposed on the second lateral portion; a first saw table vertically slidably disposed on the first mounting seat; a second saw table vertically slidably disposed on the second mounting seat; a first drive unit disposed between the first mounting seat and the first saw table and including a first motor which is fixed to the first mounting seat and includes a first rotary shaft, a first screw which is rotatably disposed on the first mounting seat and connected to the first rotary shaft, and a first nut which is screwed to the first screw and fixed to the first mounting seat; a second drive unit disposed between the second mounting seat and the second saw table and including a second motor which is fixed to the second mounting seat and includes a second rotary shaft, a second screw which is rotatably disposed on the second mounting seat and connected to the second rotary shaft, and a second nut which is screwed to the second screw and fixed to the second mounting seat; a bandsaw unit including a first movable seat fixed to the first saw table, a drive wheel and a driven wheel which are rotatably disposed on the first movable seat, a drive motor which is disposed on the first movable seat to rotate the drive wheel, a second movable seat fixed to the second saw table, an assistant wheel rotatably and movably disposed on the second movable seat, a second driven wheel rotatably disposed on the second movable seat, and a band blade which rides on the drive wheel, the first driven wheel, the assistant wheel and the second driven wheel; and an adjustment unit fixed to the second movable seat and connected to the assistant wheel to drive the assistant wheel to move horizontally on the second movable seat;

characterized in that: two first rails are longitudinally arranged on the first mounting seat and perpendicular to the work platform, a plurality of first slide blocks are slidably disposed on the first rails and fixed to the first saw table, the first drive unit is located between the two first rails, two second rails longitudinally arranged on the second mounting seat and perpendicular to the work platform, a plurality of second slide blocks slidably disposed on the second rails and fixed to the second saw table, and the second drive unit is located between the two second rails.

Preferably, the cutting-angle adjustable bandsaw further comprises a first pivot seat fixed to the first mounting seat, and the first screw includes a first upper rod portion connected to the first rotary shaft, and a first lower rod portion pivoted to the first pivot seat.

Preferably, the cutting-angle adjustable bandsaw further comprises a second pivot seat fixed to the second mounting seat, and the second screw includes a second upper rod portion connected to the second rotary shaft, and a second lower rod portion pivoted to the second pivot seat.

Preferably, the adjustment unit drives the assistant to move horizontally along the second movable seat.

Preferably, the adjustment unit includes a pressure cylinder fixed on the second movable seat, a link, and a connecting rod, the pressure cylinder includes a cylinder body and a piston rod movably disposed in the cylinder, the link is fixed to the piston rod and includes a connecting hole, the connecting rod is connected between the link and the assistant wheel and includes a first connecting section inserted in the connecting hole, and a second connecting section to which the assistant wheel is pivoted.

Preferably, the assistant wheel includes a pivot hole, and a bearing is disposed between the pivot hole and the second connecting section.

Preferably, the adjustment unit includes a pressure cylinder fixed on the second movable seat, a link, and a connecting rod, the pressure cylinder includes a cylinder body and a piston rod movably disposed in the cylinder, the link is fixed to the piston rod and includes a connecting hole, the connecting rod is connected between the link and the assistant wheel and includes a first connecting section inserted in the connecting hole, and a second connecting section to which the assistant wheel is pivoted.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 1, 2, 3, 4 and 7, a cutting-angle adjustable bandsaw in accordance with the present invention comprises a base 10, a first mounting seat 21, a second mounting seat 22, a first saw table 31, a second saw table 32, a first drive unit 40, a second drive unit 50, a bandsaw unit 60 and an adjustment unit 70.

The base 10 includes a work platform 11, a first lateral portion 12 disposed at one side of the work platform 11, and a second lateral portion 13 disposed at another side of the work platform 11.

As shown in FIGS. 2, 4, 5 and 6, the first mounting seat 21 is horizontally slidably disposed on the first lateral portion 12 and includes two first rails 211 longitudinally arranged on the first mounting seat 21 and perpendicular to the work platform 11, and a plurality of first slide blocks 212 slidably disposed on the first rails 211. For easy understanding, only a slide block is shown. The first drive unit 40 is located between the two first rails 211.

Referring then to FIGS. 2, 7, 8 and 9, the second mounting seat 22 is horizontally slidably disposed on the second lateral portion 13 and includes two second rails 221 longitudinally arranged on the second mounting seat 22 and perpendicular to the work platform 11, and a plurality of second slide blocks 222 slidably disposed on the second rails 221. The second drive unit 50 is located between the two second rails 221.

The first and second lateral portions 12, 13 are provided on a top surface thereof with a rail 26, 27, respectively, and the first and second mounting seats 21, 22 are provided at a lower surface thereof with a slide block 28, 29 which is slidably mounted on the rails 26, 27 to enable the first and second mounting seats 21, 22 to slide along the first and second lateral portions, 12, 13.

The first saw table 31 is vertically slidably disposed on the first mounting seat 21. In this embodiment, the first saw table 31 is fixed on the first slide block 212.

The second saw table 32 is vertically slidably disposed on the second mounting seat 22. In this embodiment, the second saw table 32 is fixed on the second slide block 222.

Figure 1:
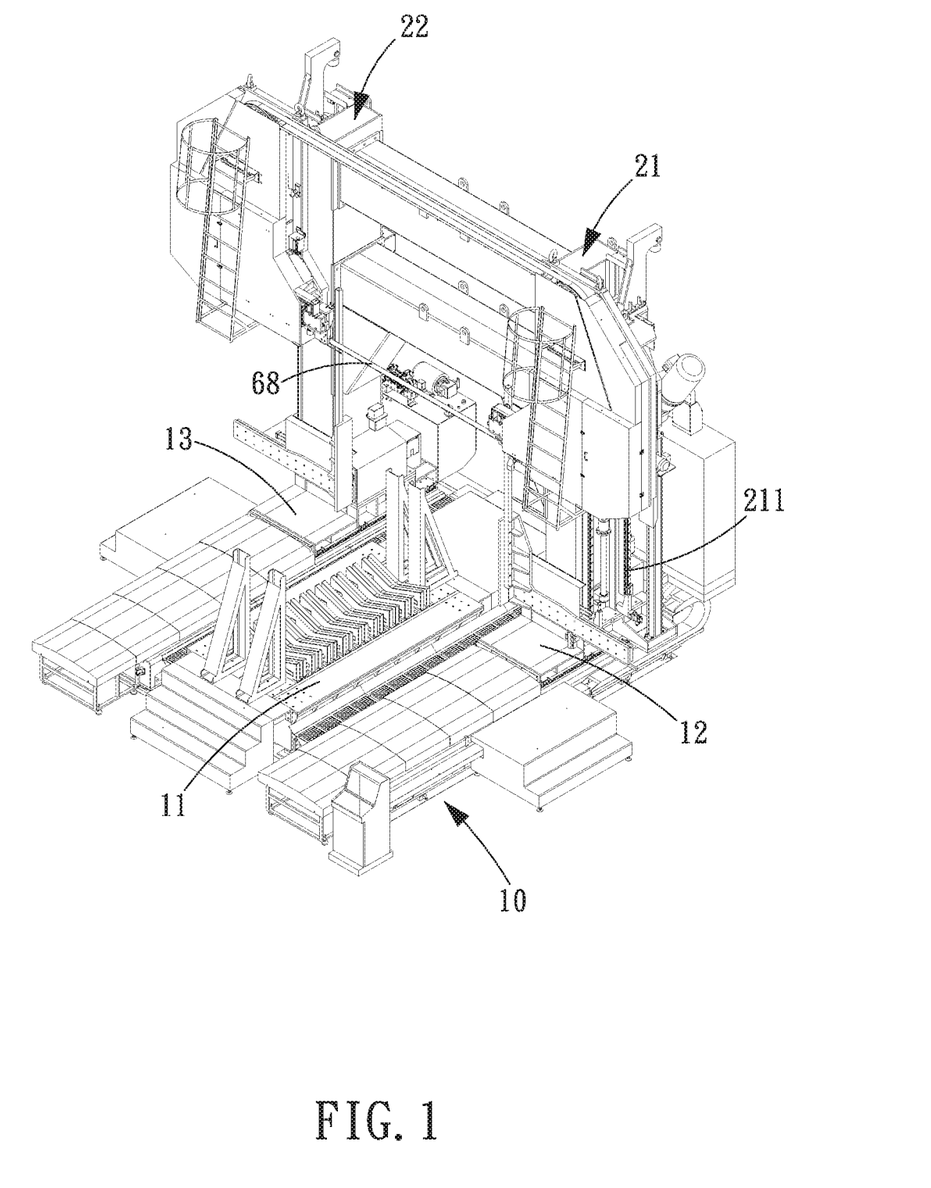
FIG. 1 is a perspective view of a cutting-angle adjustable bandsaw in accordance with the present invention.
Figure 2:
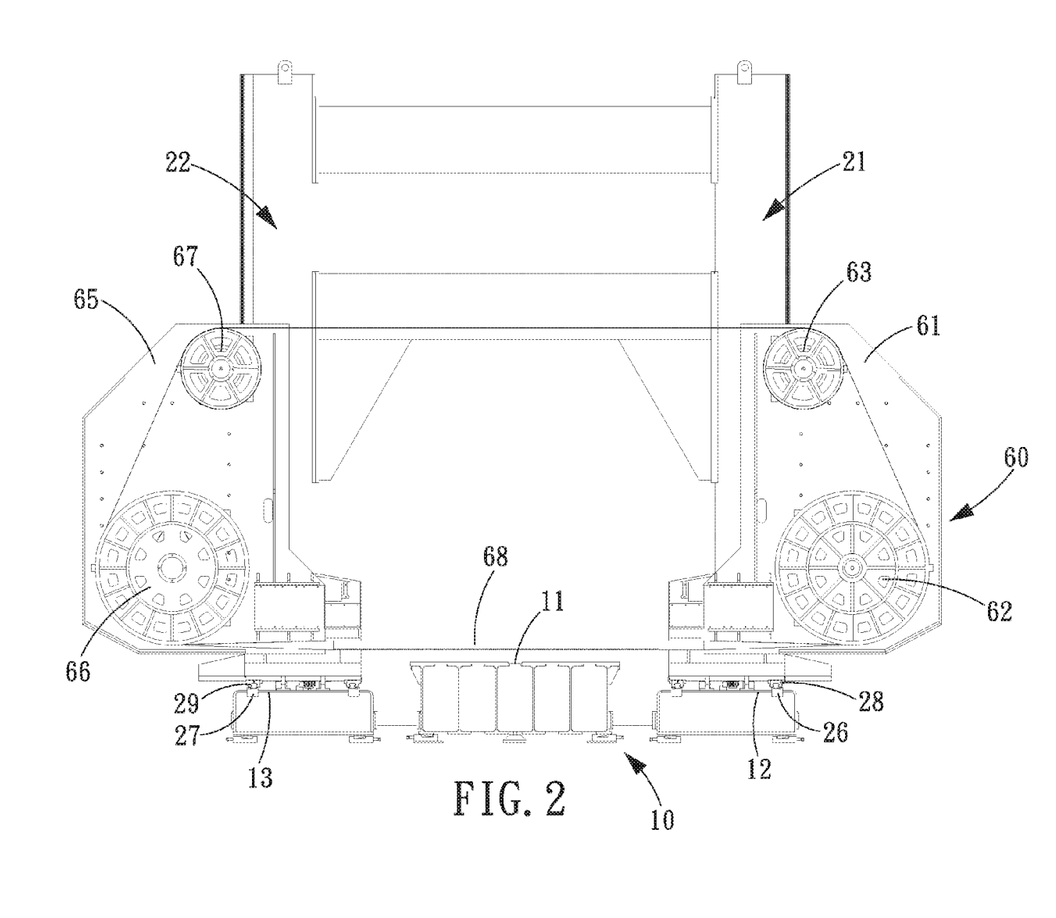
FIG. 2 is a front view of the cutting-angle adjustable bandsaw in accordance with the present invention cutting-angle adjustable bandsaw in accordance with the present invention.
Figure 3:
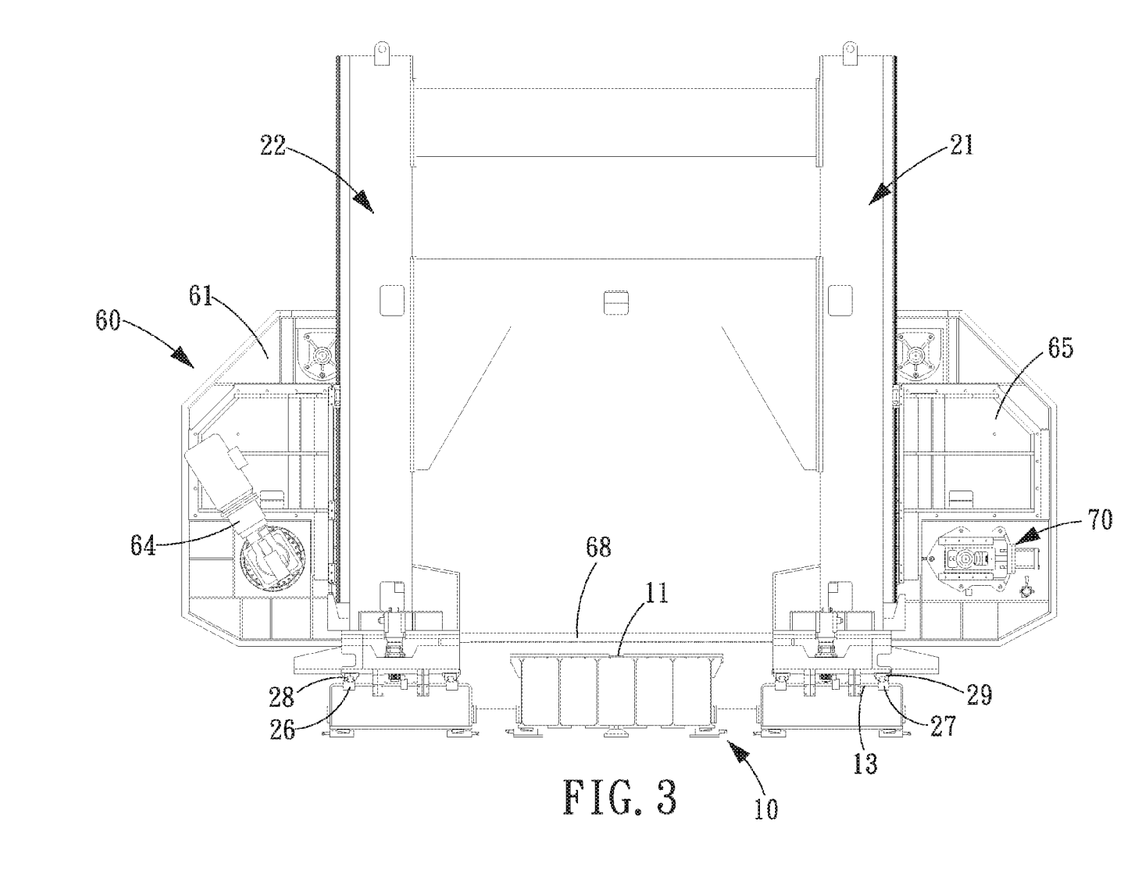
FIG. 3 is a rear view of the cutting-angle adjustable bandsaw in accordance with the present invention.
Figure 4:
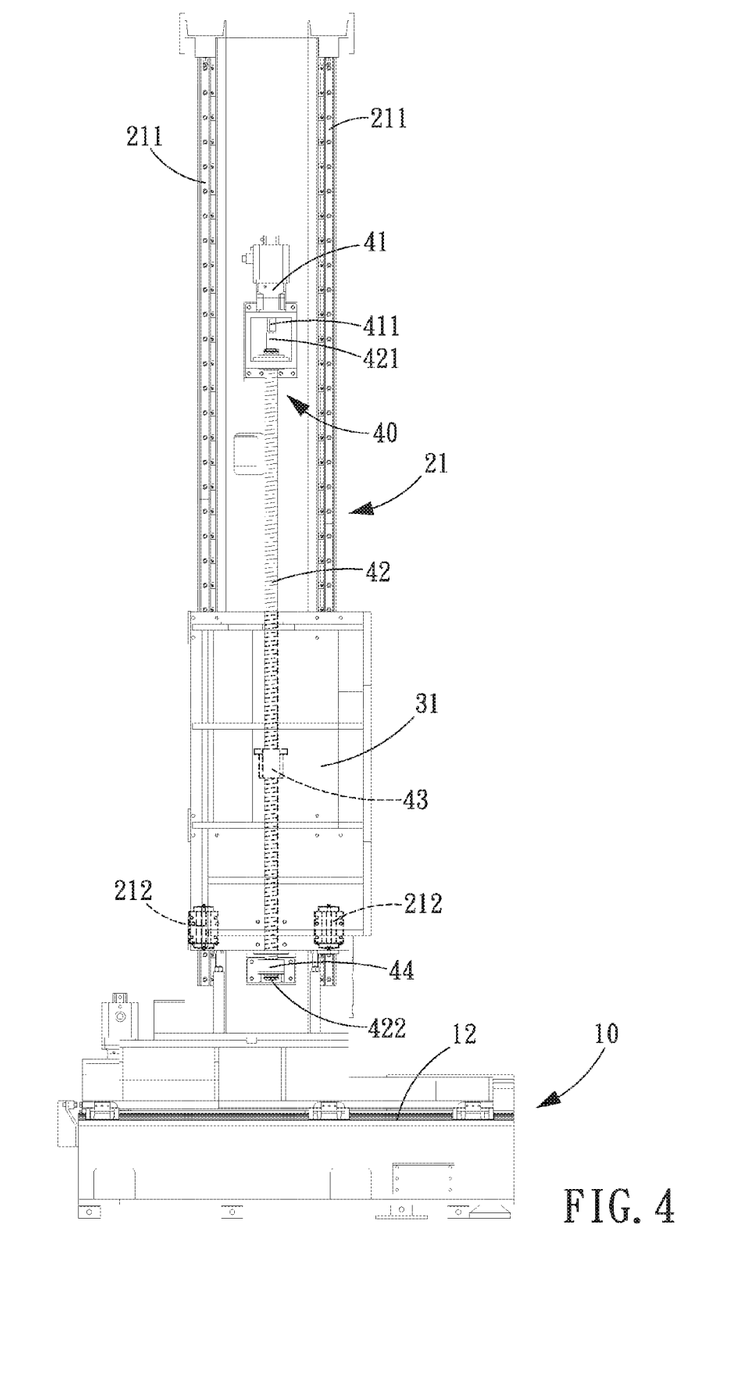
FIG. 4 is a right side view of a part of the cutting-angle adjustable bandsaw in accordance with the present invention, showing the assembling relations among the first saw table, the first mounting seat, and the first drive unit.
Figure 5:
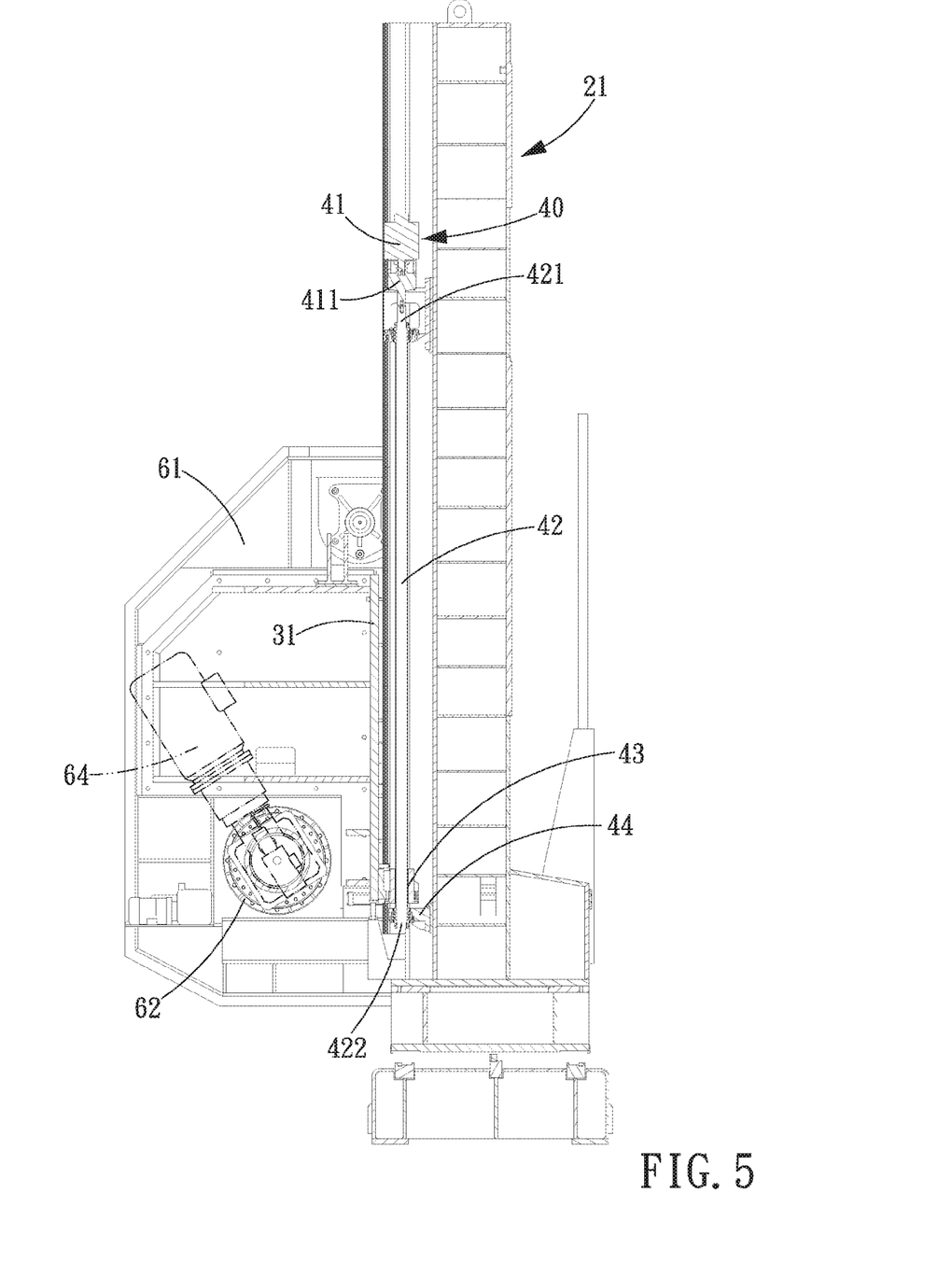
FIG. 5 is a rear cross sectional view of a part of the cutting-angle adjustable bandsaw in accordance with the present invention.
Figure 6:
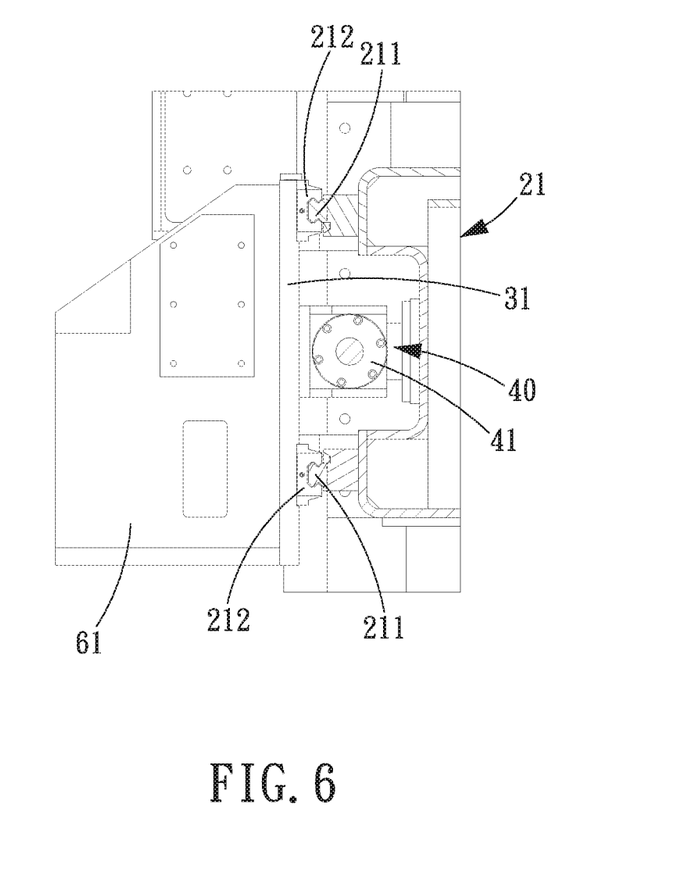
FIG. 6 is a top view of a part of the cutting-angle adjustable bandsaw in accordance with the present invention.

Referring then to FIGS. 4-6, the first drive unit 40 is disposed between the first mounting seat 21 and the first saw table 31 and includes: a first motor 41 (preferably servo motor) which is fixed to the first mounting seat 21 and includes a first rotary shaft 411, a first screw 42 which is rotatably disposed on the first mounting seat 21 and connected to the first rotary shaft 411, and a first nut 43 which is screwed to the first screw 42 and fixed to the first saw table 31. In this embodiment, the first drive unit 40 further comprises a first pivot seat 44 fixed to the first mounting seat 21, and the first screw 42 includes a first upper rod portion 421 connected to the first rotary shaft 411, and a first lower rod portion 422 pivoted to the first pivot seat 44.

Figure 7:
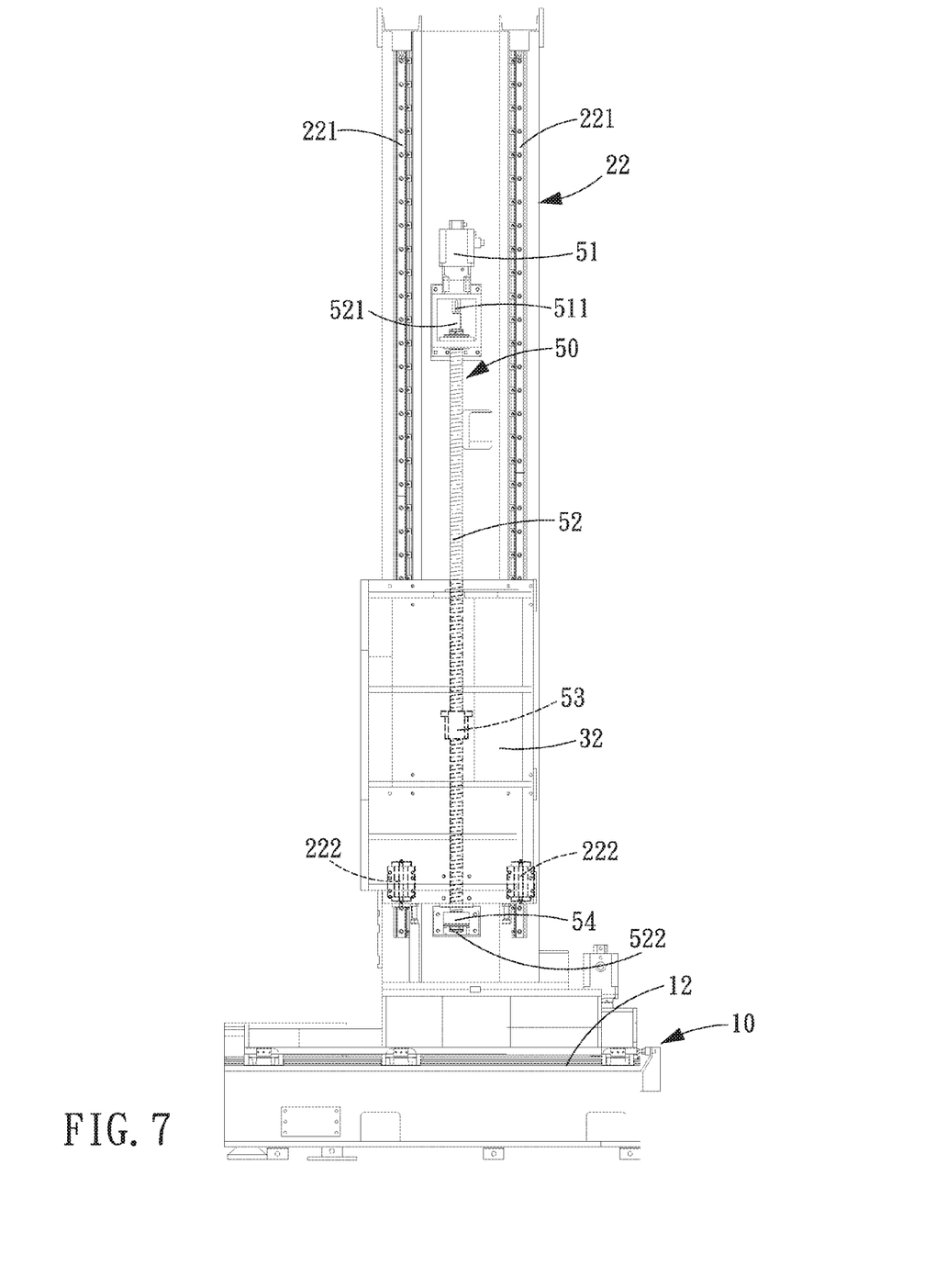
FIG. 7 is a left view of a part of the cutting-angle adjustable bandsaw in accordance with the present invention.
Figure 8:
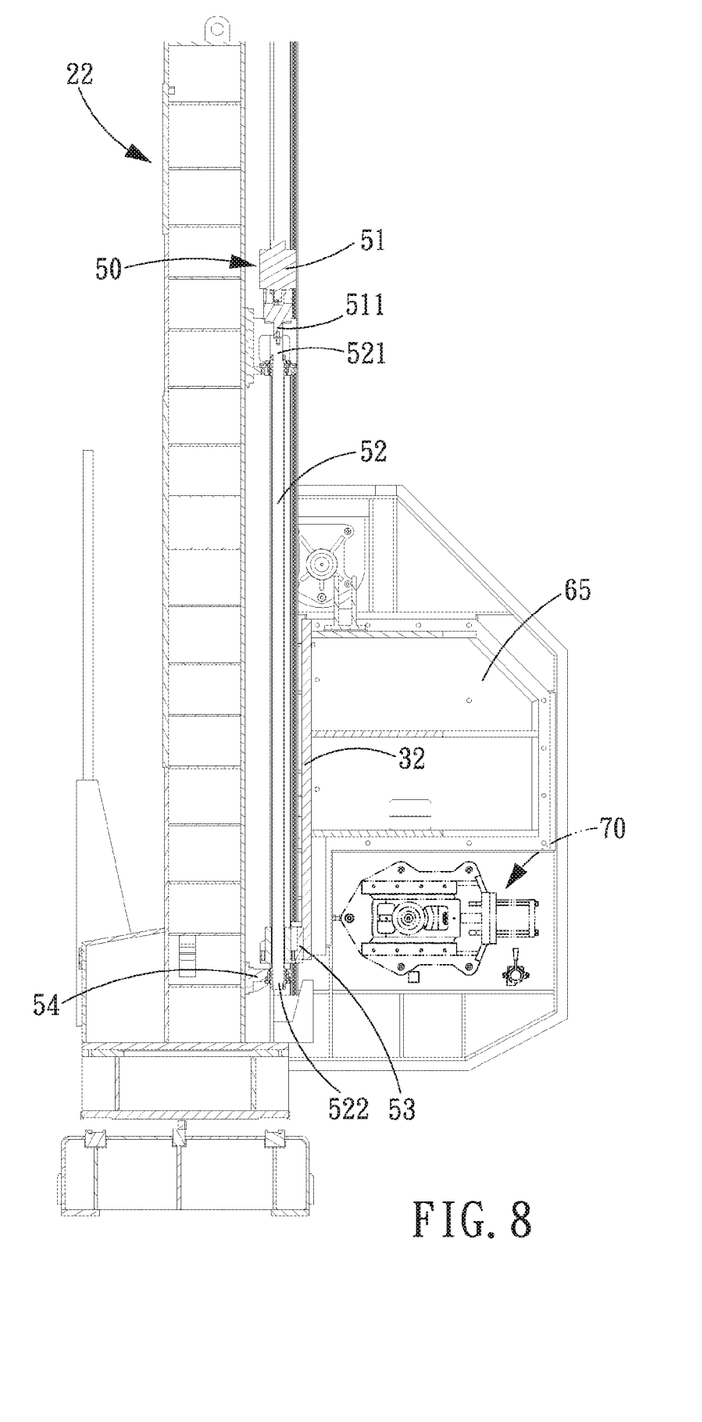
FIG. 8 is a rear cross sectional view of a part of the cutting-angle adjustable bandsaw in accordance with the present invention showing the assembling relations among the second saw table, the second mounting seat, and the second drive unit.
Figure 9:
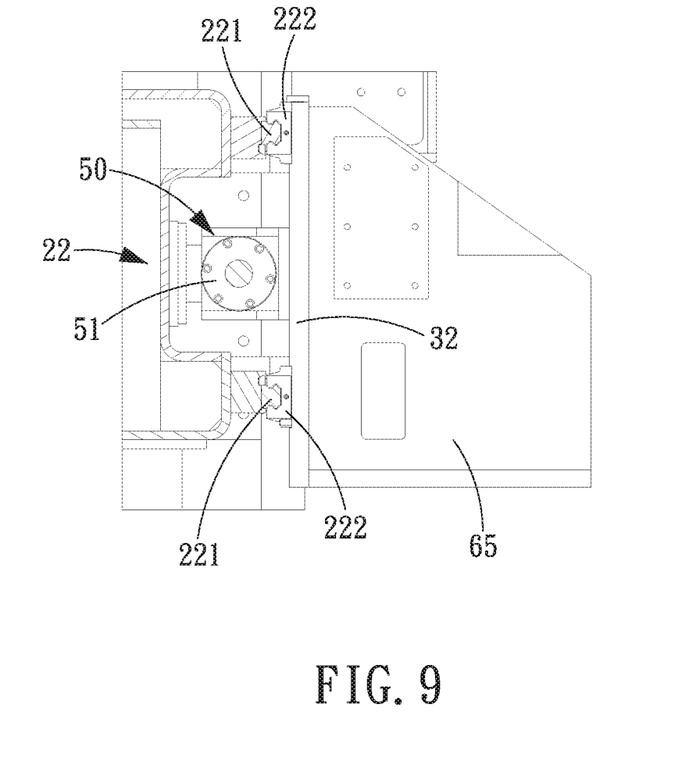
FIG. 9 is a top view of a part of the cutting-angle adjustable bandsaw in accordance with the present invention showing the assembling relations among the second saw table, the second mounting seat, and the second drive unit.

Referring then to FIGS. 7-9, the second drive unit 50 is disposed between the second mounting seat 22 and the second saw table 32 and includes: a second motor 51 (preferably servo motor) which is fixed to the second mounting seat 22 and includes a second rotary shaft 511, a second screw 52 which is rotatably disposed on the second mounting seat 22 and connected to the second rotary shaft 511, and a second nut 53 which is screwed to the second screw 52 and fixed to the second saw table 32. In this embodiment, the second drive unit 50 further comprises a second pivot seat 54 fixed to the second mounting seat 22, and the second screw 52 includes a second upper rod portion 521 connected to the second rotary shaft 511, and a second lower rod portion 522 pivoted to the second pivot seat 54.

Referring then to FIGS. 2, 3, 5, 6, 8 and 9, the bandsaw unit 60 includes a first movable seat 61 fixed to the first saw table 31, a drive wheel 62 and a driven wheel 63 which are rotatably disposed on the first movable seat 61, a drive motor 64 which is disposed on the first movable seat 61 and serves to drive the drive wheel 62 rotate, a second movable seat 65 fixed to the second saw table 32, an assistant wheel 66 which is rotatably and movably disposed on the second movable seat 65, a second driven wheel 67 which is rotatably disposed on the second movable seat 65, and a band blade 68 which rides on the drive wheel 62, the first driven wheel 63, the assistant wheel 66 and the second driven wheel 67.

Figure 10:
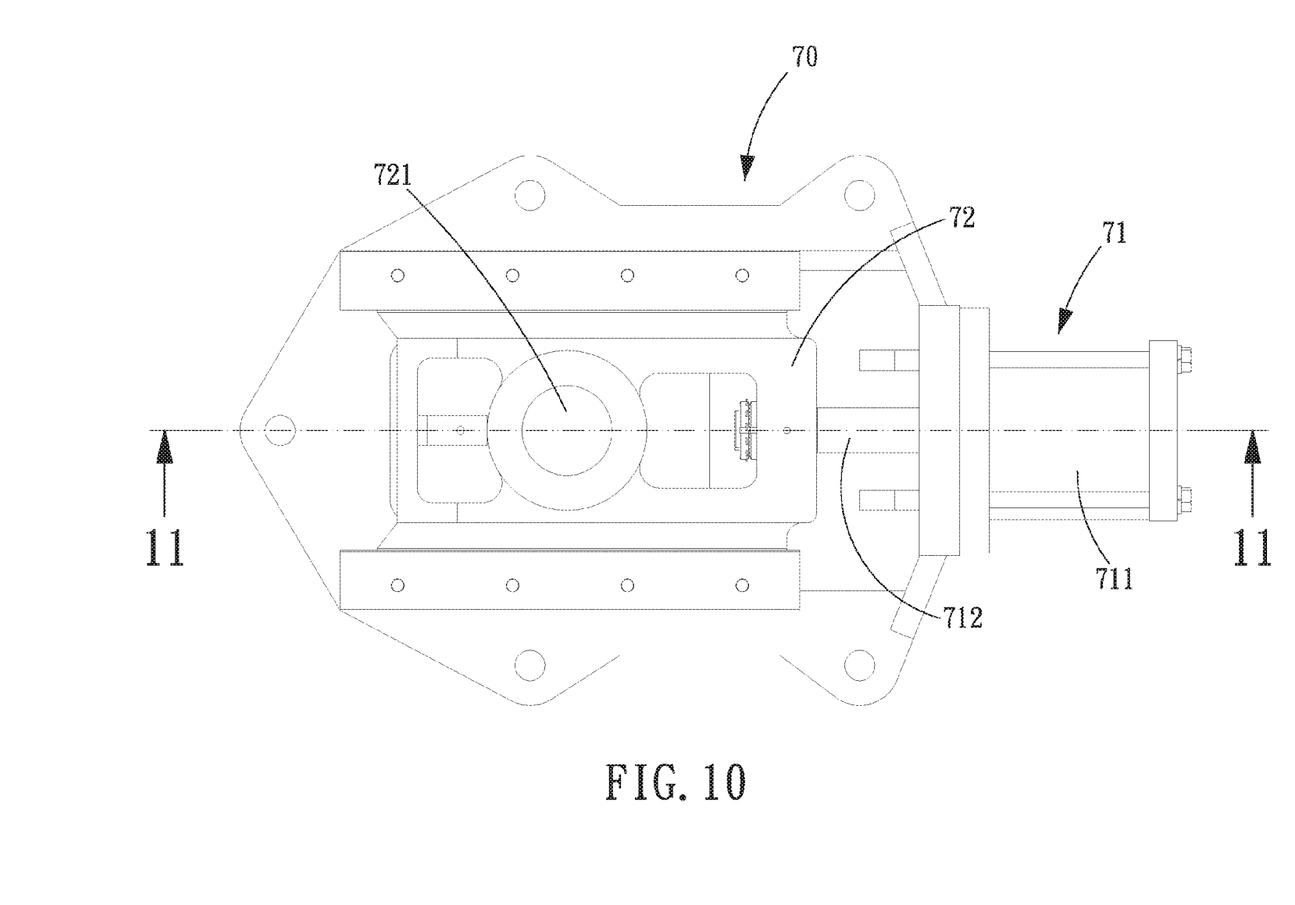
FIG. 10 is an assembly view of the cutting-angle adjustable bandsaw in accordance with the present invention cutting-angle adjustable bandsaw in accordance with the present invention.
Figure 11:
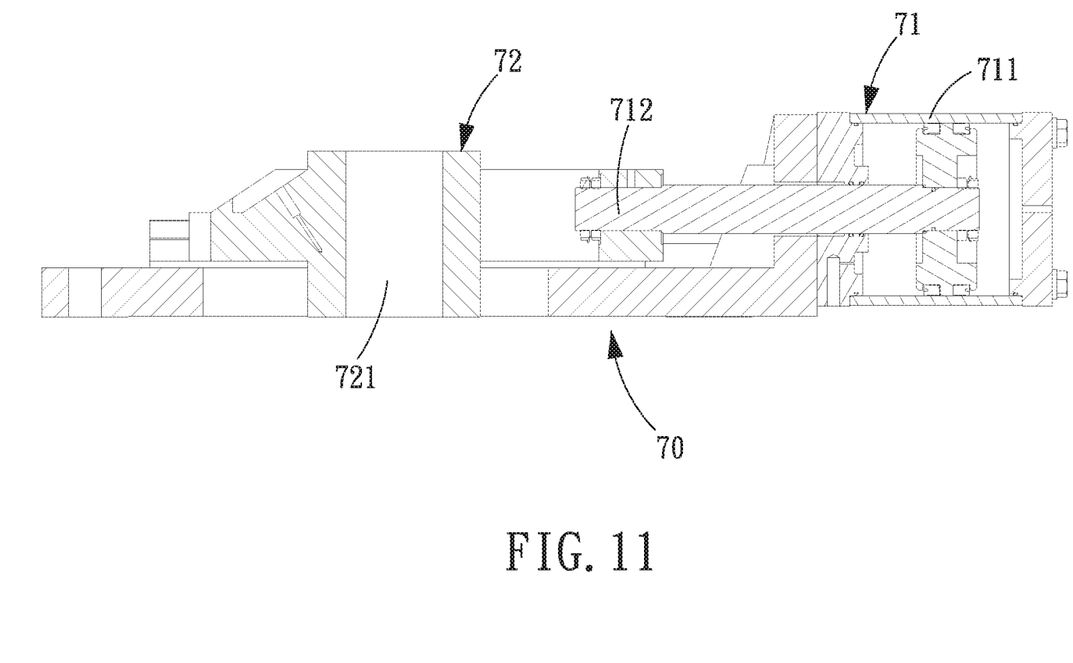
FIG. 11 is a cross sectional view taken along the line 11-11 of FIG. 10.
Figure 12:
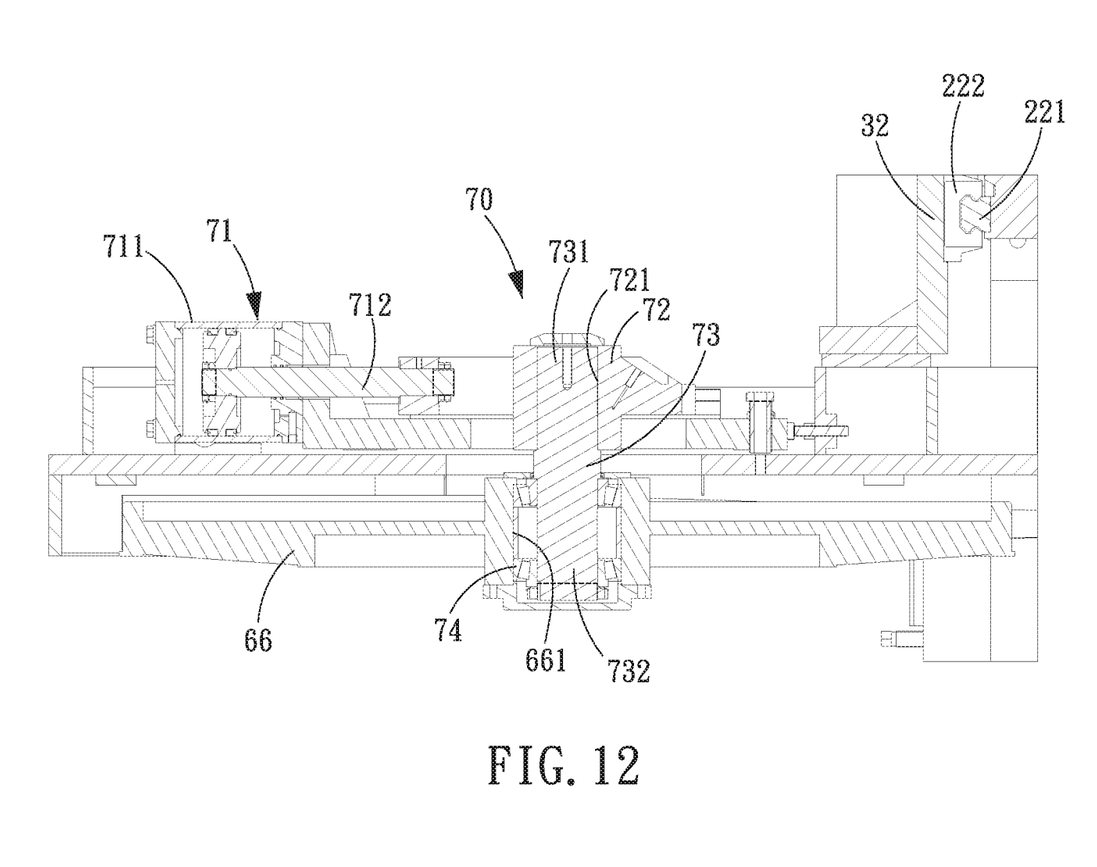
FIG. 12 is a cross sectional view of the cutting-angle adjustable bandsaw in accordance with the present invention showing that the adjustment unit is disposed on the second movable seat.

Referring then to FIGS. 10-12, the adjustment unit 70 is fixed to the second movable seat 65 and connected to the assistant wheel 66 to drive the assistant wheel 66 to move horizontally on the second movable seat 65. In this embodiment, the adjustment unit 70 includes a pressure cylinder 71 fixed on the second movable seat 65, a link 72, and a connecting rod 73. The pressure cylinder 71 includes a cylinder body 711 and a piston rod 712 movably disposed in the cylinder body 711. The link 72 is fixed to the piston rod 712 and includes a connecting hole 721. The connecting rod 73 is connected between the link 72 and the assistant wheel 66 and includes a first connecting section 731 inserted in the connecting hole 721, and a second connecting section 732 to which the assistant wheel 66 is pivoted. The assistant wheel 66 includes a pivot hole 661, and a bearing 74 is disposed between the pivot hole 661 and the second connecting section 732.

As shown in FIGS. 2, 4, 5, 7, 8 and 15A, when the bandsaw of the present invention performs horizontal cutting, the first and second drive units 40, 50 will be controlled to work to make the first and second saw tables 31, 32 and the drive wheel 62 and the assistant wheel 66 locate in the same plane, as a result, the band blade 68 ridding on the drive wheel 62 and the assistant wheel 66 is adjusted to a horizontal position. Then, the first and second drive units 40, 50 are controlled to make the first and second saw tables 31, 32 vertically move at the same speed at the first and second mounting seats 21, 22, respectively, so as to perform horizontal cutting of the object 80 to be cut.

Figure 13:
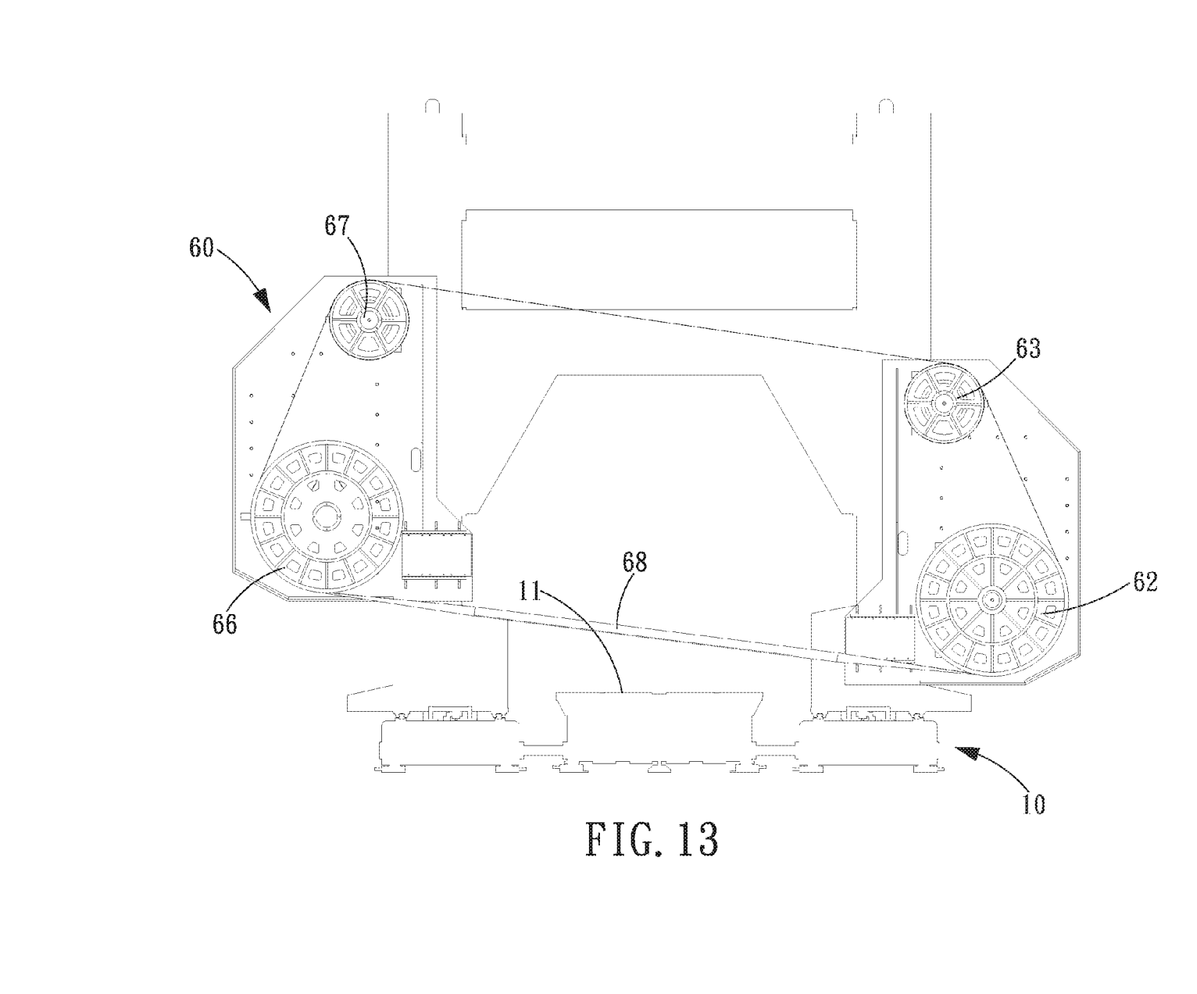
FIG. 13 is an operational view of the cutting-angle adjustable bandsaw in accordance with the present invention, wherein the band blade is high on the left and low on the right.
Figure 15A:
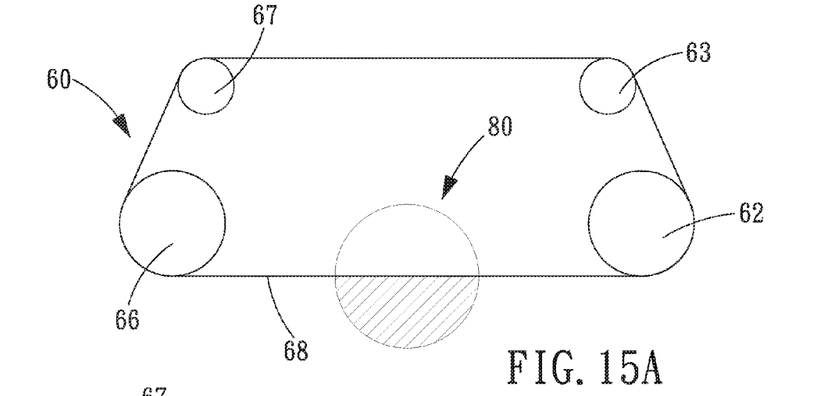
FIG. 15A shows that the bandsaw of the present invention is horizontally cutting an object.
Figure 15B:
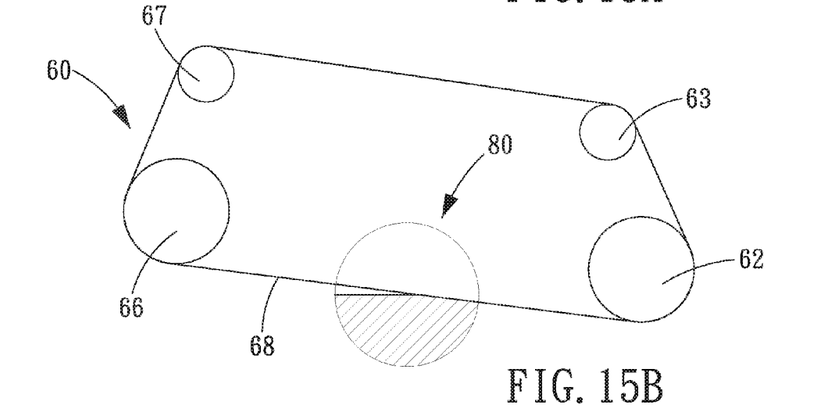
FIG. 15B shows that the bandsaw of the present invention is inclined and cutting the object, wherein the band blade is high on the left and low on the right.

During horizontal cutting, if the contact area between the band blade 68 and the object 80 to be cut is too big (as shown in FIG. 15A) and causes a large cutting resistance, the user can control the first or second drive unit 40, 50. For example, as shown in FIGS. 7, 8 and 13, the second drive unit 50 is controlled to make the second saw table 32, the second movable seat 65, the assistant wheel 66 and the second driven wheel 67 vertically move upward or downward. FIG. 15B shows the example that the vertical upward movement of the second saw table 32 causes the assistant wheel 66 and the drive wheel 62 to be located at different horizontal planes, and the band blade 68 riding between the drive wheel 62 and the assistant wheel 66 is inclined (high on the left and low on the right), so that the cutting angle of the band blade 68 is changed to reduce the contact area between the band blade 68 and the object 80 to be cut, resulting in a reduction of cutting resistance and power saving.

Figure 15C:
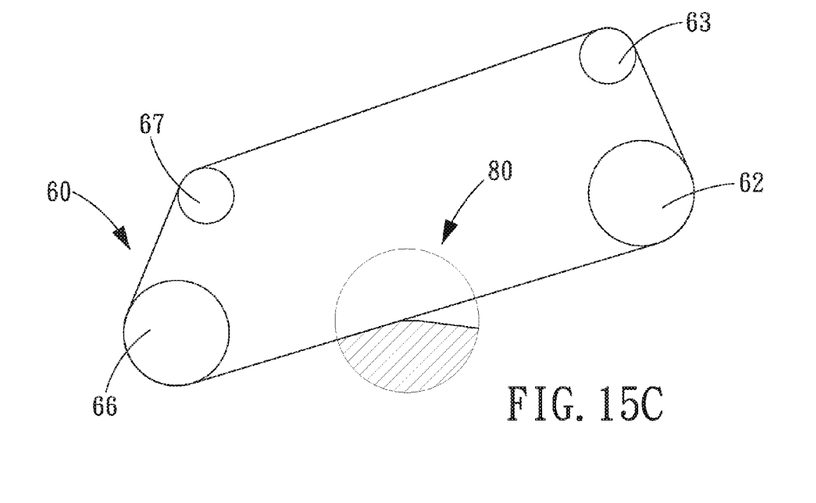
FIG. 15C shows that the bandsaw of the present invention is inclined and cutting the object, wherein the band blade is high on the right and low on the left.

Referring then to FIGS. 7, 8 and 15C, the second drive unit 50 is controlled to drive the second saw table 32, the second movable seat 65, the assistant wheel 66 and the second driven wheel 67 vertically move downward, causing the assistant wheel 66 and the drive wheel 62 to be located at different horizontal planes, and the band blade 68 riding between the drive wheel 62 and the assistant wheel 66 will be inclined (high on the right and low on the left), so that the cutting angle of the band blade 68 is changed to reduce the contact area between the band blade 68 and the object 80 to be cut, resulting in a reduction of cutting resistance and power saving.

It is to be noted that, in addition to using the second drive unit 50 to make the second saw table 32 and the respective components thereon vertically move upward, the inclined state of the band blade 68 being high on the left and low on the right can also be achieved by using the first drive unit 40 to make the first saw table 61 move vertically downward. Similarly, using the first drive unit 40 to drive the first saw table 31 and the components thereon to move vertically upward can also adjust the band blade 68 to be an inclined state, wherein the band blade 68 is high on the right and low on the left.

Figure 14:
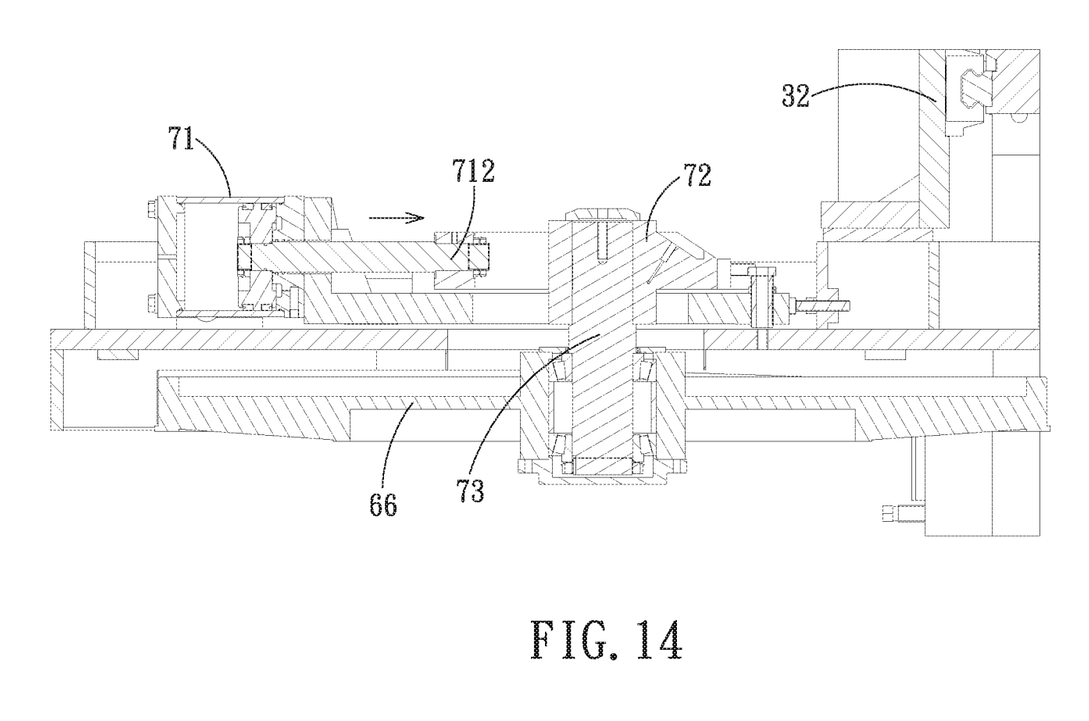
FIG. 14 is an operational view of the cutting-angle adjustable bandsaw in accordance with the present invention, wherein the band blade is high on the right and low on the left.

As shown in FIGS. 12-14, during the cutting angle adjustment of the band blade 68, the first and second saw tables 31, 32 are located in different horizontal planes (namely different heights), and in order to prevent fatigue and break of the band blade 68 riding on the drive wheel 62, the first driven wheel 63, the assistant wheel 66 and the second driven wheel 67, it can use the adjustment unit 70 mounted on the second movable seat 65 to loosen the band blade 68 by driving the assistant wheel 66 to move horizontally along the second movable seat 65, so as to prevent the occurrence of fatigue and break of the band blade 68 during cutting angle adjustment. Once the cutting angle adjustment is done, the band blade 68 will be tensioned again in order to proceed cutting operation successfully. For example, as shown in FIG. 14, the piston rod 712 of the pressure cylinder 71 is controlled to extend out toward the second saw table 32 to drive the link 72, the connecting rod 73 and the assistant wheel 66 to move toward the second saw table 32, so that the band blade 68 is loosened.

While we have shown and described various embodiments in accordance with the present invention, it is clear to those skilled in the art that further embodiments may be made without departing from the scope of the present invention.

What is claimed is:

1. A cutting-angle adjustable bandsaw comprising:
a base including a work platform, a first lateral portion disposed at one side of the work platform, and a second lateral portion disposed at another side of the work platform; a first mounting seat horizontally slidably disposed on the first lateral portion; a second mounting seat horizontally slidably disposed on the second lateral portion; a first saw table vertically slidably disposed on the first mounting seat; a second saw table vertically slidably disposed on the second mounting seat; a first drive unit disposed between the first mounting seat and the first saw table and including a first motor which is fixed to the first mounting seat and includes a first rotary shaft, a first screw which is rotatably disposed on the first mounting seat and connected to the first rotary shaft, and a first nut which is screwed to the first screw and fixed to the first mounting seat; a second drive unit disposed between the second mounting seat and the second saw table and including a second motor which is fixed to the second mounting seat and includes a second rotary shaft, a second screw which is rotatably disposed on the second mounting seat and connected to the second rotary shaft, and a second nut which is screwed to the second screw and fixed to the second mounting seat; a bandsaw unit including a first movable seat fixed to the first saw table, a drive wheel and a driven wheel which are rotatably disposed on the first movable seat, a drive motor which is disposed on the first movable seat to rotate the drive wheel, a second movable seat fixed to the second saw table, an assistant wheel rotatably and movably disposed on the second movable seat, a second driven wheel rotatably disposed on the second movable seat, and a band blade which rides on the drive wheel, the first driven wheel, the assistant wheel and the second driven wheel; and an adjustment unit fixed to the second movable seat and connected to the assistant wheel to drive the assistant wheel to move horizontally on the second movable seat;
characterized in that: two first rails are longitudinally arranged on the first mounting seat and perpendicular to the work platform, a plurality of first slide blocks are slidably disposed on the first rails and fixed to the first saw table, the first drive unit is located between the two first rails, two second rails longitudinally arranged on the second mounting seat and perpendicular to the work platform, a plurality of second slide blocks slidably disposed on the second rails and fixed to the second saw table, and the second drive unit is located between the two second rails.

2. The cutting-angle adjustable bandsaw as claimed in claim 1 further comprises a first pivot seat fixed to the first mounting seat, and the first screw includes a first upper rod portion connected to the first rotary shaft, and a first lower rod portion pivoted to the first pivot seat.

3. The cutting-angle adjustable bandsaw as claimed in claim 1 further comprises a second pivot seat fixed to the second mounting seat, and the second screw includes a second upper rod portion connected to the second rotary shaft, and a second lower rod portion rotatably connected to the second pivot seat.

4. The cutting-angle adjustable bandsaw as claimed in claim 1, wherein the adjustment unit drives the assistant wheel to move horizontally along the second movable seat.

5. The cutting-angle adjustable bandsaw as claimed in claim 4, wherein the adjustment unit includes a pressure cylinder fixed on the second movable seat, a link, and a connecting rod, the pressure cylinder includes a cylinder body and a piston rod movably disposed in the cylinder, the link is fixed to the piston rod and includes a connecting hole, the connecting rod is connected between the link and the assistant wheel and includes a first connecting section inserted in the connecting hole, and a second connecting section to which the assistant wheel is rotatably connected.

6. The cutting-angle adjustable bandsaw as claimed in claim 1, wherein the adjustment unit includes a pressure cylinder fixed on the second movable seat, a link, and a connecting rod, the pressure cylinder includes a cylinder body and a piston rod movably disposed in the cylinder, the link is fixed to the piston rod and includes a connecting hole, the connecting rod is connected between the link and the assistant wheel and includes a first connecting section inserted in the connecting hole, and a second connecting section to which the assistant wheel is rotatably connected.

7. The cutting-angle adjustable bandsaw as claimed in claim 6, wherein the assistant wheel includes a pivot hole, and a bearing is disposed between the pivot hole and the second connecting section.

\* \* \* \* \*